United States Patent Office 3,414,628
Patented Dec. 3, 1968

3,414,628
PREPARATION OF TETRAFLUOROMETHANE
Joachim Massonne, Hannover-Kleefeld, Germany, assignor to Kali-Chemie Aktiengesellschaft, Hannover, Germany
No Drawing. Filed Dec. 21, 1966, Ser. No. 603,415
Claims priority, application Germany, Dec. 28, 1965, K 58,025
4 Claims. (Cl. 260—653.8)

ABSTRACT OF THE DISCLOSURE

Trifluoromethane is reacted with an excess of elementary fluorine to obtain tetrafluoromethane substantially free of perfluorinated higher alkanes.

---

This invention relates to a method of preparing tetrafluoromethane in high yields by the reaction of trifluoromethane with elementary fluorine.

Tetrafluoromethane is an extremely stable compound and is used as deep refrigerant, gaseous insulating medium, and inert gas.

Various methods are known for the preparation of tetrafluoromethane. It is formed, e.g., in addition to other fluorohydrocarbons, in strongly exothermic reaction when heating carbon in a current of fluorine in presence of a catalyst.

Recently, it has been proposed to obtain tetrafluoromethane by fluorination of polytetrafluoroethylene. Also in this reaction, other fluorocarbons are formed besides tetrafluoromethane, and the temperature of the reaction is difficult to control. In addition, pyrolysis products of polytetrafluoroethylene may be developed too.

According to another method, fluorine is introduced into carbon tetrachloride boiling under reflux. This reaction takes place with flame development and produces, in addition to the tetrafluoromethane, trifluorochloromethane, dichlorodifluoromethane, and trichloromonofluoromethane. Finally, it has been proposed to prepare tetrafluoromethane in a flame reaction of fluorine with trifluoromonochloromethane or difluorodichloromethane. Also in said reaction, no pure tetrafluoromethane is produced. After separation from chlorine and unreacted fluorine, considerable proportions of non-reacted trifluorochloromethane or difluorodichloromethane have to be also removed.

O. Ruff, B. 69 (1936), p. 303 has described the reaction of trifluoromethane (fluoroform) with fluorine and stated that it requires ignition and produces, in addition to hydrogen fluoride, tetrafluoromethane and hexafluoroethane according to the equations (1)  $CHF_3 + F_2 \rightarrow CF_4 + HF$
(2)  $2CHF_3 + F_2 \rightarrow C_2F_6 + 2HF$ When trifluoromethane and fluorine in equimolar amounts corresponding to Equation 1 are introduced into a tubular reactor and reacted therein, major amounts of higher perfluoroalkanes, particularly hexafluoroethane, are produced in addition to tetrafluoromethane. In addition, a corresponding quantity of fluorine remains in the reactor. Subsequent heating of the reaction mixture to 400–500° C. reduces the proportion of higher perfluoroalkanes only to a negligible extent. When the reaction mixture was washed in the conventional manner with water or alkali, oxygen in an amount equivalent to the fluorine content is developed according to equation (3)  $F_2 + H_2O \rightarrow 2HF + \tfrac{1}{2}O_2$ The removal of $O_2$ and $C_2F_6$ from tetrafluoromethane involves a very difficult and costly procedure.

It is, therefore, a principal object of the invention to provide a method producing tetrafluoromethane by reaction of trifluoromethane and fluorine in such a way that the formation of higher perfluoroalkanes is greatly reduced or avoided.

Other objects and advantages will become apparent from a consideration of the specification and claims.

I have found that in the reaction of trifluoromethane with elementary fluorine, the use of an excess of fluorine up to about 10 percent over the stoichiometric amount of Equation 1 prevents substantially the formation of perfluorinated higher alkanes. I have also found that it is not necessary to start the reaction by sparks or ignition but that heating the reactor to 200–400° C. is sufficient.

In a preferred embodiment of the invention, trifluoromethane and an excess of fluorine are introduced into a tubular reactor, which may consist of Monel metal or nickel. To ensure starting of the reaction, the fluorine introduction zone is preheated at 200 to 600, preferably 200 to 400° C. After the reaction has started, the heating may be discontinued, and at high throughputs the reactor walls may even have to be cooled.

An intimate mixture of the gases in the reactor is obtained by suitable devices, e.g., by introducing the fluorine through nozzles.

It is of advantage to pass the reacted gases, before they leave the reactor, through a zone heated at a temperature of 350 to 700, preferably 400 to 500° C. This ensures conversion of higher perfluoroalkanes, produced in the lower part of the reactor, to tetrafluoromethane in the upper part of the reactor by means of the excess fluorine. Said upper part of the reactor should be heated substantially during the entire reaction, even then when the temperature of the lower reaction zone proper is maintained by cooling at 400° C. The reaction mixture leaving the reactor is first freed from the major part of the hydrogen fluoride by condensation. Subsequently, the gases are passed through the bed of an alkali metal chloride, e.g. sodium chloride. In such bed, the excess fluorine is bound and an equivalent amount of chlorine is liberated. Said chlorine, and hydrogen fluoride still present are absorbed by washing the gases with alkali.

The tetrafluoromethane leaving the washer is dried and sufficiently pure to be used, without further purification, for most of its applications.

The method of the invention has considerable advantages over other methods. The preparation is very simple and can be readily controlled due to the relatively low heat development. No catalyst is required. The starting material is easily available, and can be produced, e.g., by disproportionation of difluorochloromethane over aluminum chloride at room temperature. The yield, calculated on trifluoromethane, is close to 100%. It is of particular importance that substantially no higher perfluoroalkanes are formed, thereby obviating the otherwise required difficult and expensive purification and separation procedures. The tetrafluoromethane is obtained almost 100% pure, due to the separation of the hydrogen fluoride, generated in the reaction, by condensation, and by avoiding that unreacted fluorine appears as obnoxious oxygen because it is reacted with alkali metal chloride and the thus produced chlorine is bound as water soluble hypochlorite by washing with caustic alkali solution.

Any excess of fluorine over the stoichiometric amount produces a lower proportion of higher perfluorinated alkanes and a corresponding yield increase of tetrafluoromethane. Generally, the excess of fluorine will be not less than about 1 percent of the stoichiometric amount. An almost quantitative yield, calculated on trifluoromethane, is accomplished already with an excess of about 7 percent of fluorine. Excesses larger than 10 percent produce hardly any further improvement of the yield and are uneconomic. When applying an after-treatment as set forth hereinabove, the purity of the tetrafluoromethane is further increased in a relatively simple manner.

The following examples further illustrate the invention.

Example 1

Gaseous trifluoromethane in an amount of 90 liter/hour is introduced into the lower part of a vertical tubular Monel reactor having a length of 880 mm. and an inner diameter of 50 mm. Elementary fluorine in an amount of 91 liter/hour was injected through a tube provided with 7 nozzles and introduced into the reactor from below so that the nozzles were located 150 mm. above the lower end of the reactor. The fluorine had a purity of 99 percent by volume, the balance being carbon tetrafluoride (0.2%) and oxygen + nitrogen (0.8%). The reactor section at the level of the fluorine injecting nozzles had been preheated by means of a displaceable electric furnace at 200° C. The upper section of the reactor tube was heated for a length of 30 cm. at 500° C. Shortly after the beginning of the reaction, the heating means at the fluorine introduction zone was removed and the wall temperature of the reactor at said zone was adjusted to about 400° C. by air cooling.

The gases leaving the reactor were washed with 20% potassium hydroxide solution. After a reaction time of 15 minutes, the gases had the following gas chromatographically determined composition, all figures indicating volume percentages: 89% $CF_4$, 4% $C_2F_6$, 0.4% $C_3F_8$, 0.1% $C_4F_{10}$, 6.5% air.

Example 2

This test was carried out essentially like Example 1. The difference was only that the gases leaving the reactor passed through a gas trap which was cooled to −40° C. and in which the major part of the generated hydrogen fluoride was condensed. Subsequently, the gases were passed into an absorption tower filled with coarse-crystalline sodium chloride. Then, the gas was washed, like in Example 1, with an alkali:metal hydroxide solution and analyzed. It had the following composition: 94.5% $CF_4$, 3.9% $C_2F_6$, 0.4% $C_3F_8$, 0.1% $C_4F_{10}$, and 1.0% air gases.

Example 3

This test was carried out like Example 2 with the sole difference that the elementary fluorine was introduced in an amount of 96 liter/hour. The purified gas had the following composition: 99% $CF_4$, 0.12% $C_2F_6$, 0.01% $C_3F_8$, 0.9% air gases.

The examples show the improved results obtainable by the steps of the invention. If trifluoromethane is reacted with an excess of 1 percent of fluorine only (Examples 1 and 2), there are still obtained 4% of $C_2F_6$, 0.4% of $C_3F_8$, and 0.1% of $C_4F_{10}$. If after removal of the hydrogen fluoride by condensation, the gas is passed through sodium chloride, the percentage content of the purified gas in gases of the air is reduced from 6.5 to 1 percent by volume. If fluorine is employed in a stoichiometric excess of 7 percent and the reaction mixture is after-treated as set forth in Example 2, a gas is obtained which contains 99% by volume of $CF_4$, i.e. the content of perfluorinated higher alkanes is reduced by a power of ten or completely lacking.

I claim:

1. A process of producing tetrafluoromethane comprising reacting trifluoromethane with elementary fluorine at a temperature of 200° to 500° C., said fluorine being applied in an excess up to 10 percent of the amount required by the reaction $$CHF_3 + F_2 \rightarrow CF_4 + HF.$$

2. The process as claimed in claim 1 comprising contacting the trifluoromethane and fluorine in a reaction zone preheated to a temperature of 200 to 600° C.

3. The process as claimed in claim 1 comprising heating the reacted gases at a temperature of 350 to 700° C.

4. The process as claimed in claim 1 including the steps of cooling the gases obtained in the reaction to remove the major part of hydrogen fluoride generated in said reaction by condensation, passing the gases through a bed of an alkali metal chloride, and finally washing the gases with an alkali metal hydroxide solution, thereby removing residual hydrogen fluoride and chlorine developed in said bed.

References Cited

UNITED STATES PATENTS 2,658,482  11/1953  Simons et al. _____ 260—653.8
2,478,201  8/1949  Miller et al. _____ 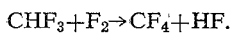260—653.8

OTHER REFERENCES

Bigelow: Chemical Reviews, 40, 51 and 60 (1947).
Ruff et al.: Z. Anorg. Allgem. Chem., 217, 1 and 2 (1934).

DANIEL D. HORWITZ, *Primary Examiner.*